United States Patent [19]

Keaton

[11] 3,932,248

[45] Jan. 13, 1976

[54] METHOD AND APPARATUS FOR MAKING LAMINATED BOARD WITH A POCKETED CORE

[76] Inventor: Clyde D. Keaton, 48 Dickinson St., Woodstown, N.J. 08098

[22] Filed: Sept. 28, 1973

[21] Appl. No.: 401,737

[52] U.S. Cl. ................ 156/210; 156/285; 156/470; 156/500; 264/92; 425/388; 428/178

[51] Int. Cl.[2] ............................................ B31F 1/20

[58] Field of Search.... 156/199, 205, 210, 470–473, 156/285, 500, 501, 209, 219; 425/363, 369, 425/224, 388; 264/90, 92; 161/127, 131

[56] References Cited

UNITED STATES PATENTS

| | | | |
|---|---|---|---|
| 2,776,451 | 1/1957 | Chavannes | 264/90 X |
| 3,226,458 | 12/1965 | Gräff et al. | 264/90 |
| 3,336,424 | 8/1967 | Cheney | 425/388 X |
| 3,525,663 | 8/1970 | Hale | 161/127 X |
| 3,594,868 | 7/1971 | Winstead | 425/388 |
| 3,682,736 | 8/1972 | Akamatsu | 156/210 |
| 3,700,523 | 10/1972 | Sato et al. | 156/285 X |
| 3,709,647 | 1/1973 | Barnhart | 425/224 |
| 3,756,884 | 9/1973 | Habino | 156/471 X |

*Primary Examiner*—Douglas J. Drummond
*Assistant Examiner*—David A. Simmons
*Attorney, Agent, or Firm*—Reising, Ethington, Barnard, Perry and Brooks

[57] ABSTRACT

Method and apparatus are disclosed for making a laminated board of thermoplastic resin. The laminated board is formed of a pocketed core sheet having inverted and non-inverted pockets disposed between a pair of face sheets which are bonded to the extremities of the pockets. The core sheet is advanced directly from the extrusion die to a roll-forming means which deforms the core sheet to form the pockets in a continuous manner. The face sheets are advanced from the respective extrusion dies on opposite sides of the core sheet and are joined therewith at controlled temperatures so as to form a bond by fusion with the extremities of the pockets. The roll-forming means comprises a drum with multiple convex and concave forming elements with means for vacuum drawing the core sheet against the forming elements and means for forced air removal of the core sheet from the roll-forming means.

12 Claims, 9 Drawing Figures

METHOD AND APPARATUS FOR MAKING LAMINATED BOARD WITH A POCKETED CORE

FIELD OF THE INVENTION

This invention relates to the manufacture of lamininated boards and more particularly to such boards made of synthetic thermoplastic resin.

BACKGROUND OF THE INVENTION

In recent years techniques have been developed for the manufacture of laminated boards for panels from plastic materials. Such boards or panels have been made in a wide range of sizes for a wide range of applications. It is known, for example, that panels for use in bulding construction may be fabricated from plastic material and may offer great advantage over the more commonplace wood panels. Such plastic panels for use in building construction and the like may be for decorative applications and therefore relatively thin, such as wall paneling, or the panels may be adapted for use as structural members where strength is important and may be relatively thick, such as a door. Another important application of laminated plastic boards is the construction of packaging cartons for storing or transporting materials such as food products or commercial and industrial articles of various kinds. This application of plastic board is, in some measure, supplanting the more conventional corrugated cardboard made of paper. The plastic board in corrugated or other laminated form offers many advantages over the conventional paper cardboard, including increased durability and especially resistance to water and chemicals as well as tear-strength.

In the manufacture of plastic board, such as laminated board made of synthetic themoplastic resin, it is desired to produce a high quality board with volume production techniques at a cost competitive with the more conventional forms of board. In the prior art the laminated plastic board has been fabricated by several techniques. One such technique is the extrusion from a single die of a plastic board having a pair of face sheets separated by longitudinally extending, laterally spaced thin walls which define parallel passages extending through the board. Such an extrusion technique is admirably suited for the production of boards which are especially suited for making cartons and the like. This technique, with the proper degree of control of temperatures and extrusion rate, results in a high quality board but the rate of production is not as great as desired. This extrusion process is disclosed in U.S. Pat. No. 3,274,315 granted Kawamura on Sept. 20, 1966.

Extruding and laminating techniques have been proposed in the prior art for making plastic board at a high rate of production. One such prior art process utilizes previously extruded plastic sheets, as supplied in rolls, and feeds one sheet through a pair of corrugating rolls to form a core sheet. A pair of face sheets are then supplied on opposite sides of the core sheet and bonded thereto. One difficulty with this process of making the corrugated board from preformed plastic sheets stems from the requirement for high temperature of the corrugating rolls. This causes the sheets to adhere to the corrugating rolls and results in deformation or undesirable stretching of the sheets. A process of this type is disclosed in U.S. Pat. No. 2,719,566 granted to Blatt on Oct. 4, 1955. A similar process is shown in U.S. Pat. No. 3,666,590 granted to Susuki et al. on May 30, 1972.

It has been proposed also in the prior art to achieve a higher rate of production of plastic board and to overcome some of the problems associated with the aforementioned processes by making laminated plastic board by corrugating a core sheet as it advances from the extruder and laying the face sheets on opposite sides thereof as they are advanced out of the respective extruders. This process has an advantage in handling the corrugated core sheet since the corrugating rolls may be at a lower temperature than the extruded sheet. For bonding the face sheets to the core sheet it has been proposed to use adhesive material at the ridges of the corrugations. It has also been proposed to use a melt-press bonding as disclosed in U.S. Pat. No. 3,723,222 granted to Kurita et al. on Mar. 27, 1973. It has also been proposed to achieve the bonding by maintaining the face sheets and the core sheet at sufficiently high temperatures to effect bonding at the time they are brought together.

The bonding of the face sheets to the core sheet by fusion and thus avoiding the need for adhesive material, is highly advantageous but it does pose certain control problems in maintaining the proper temperatures and rate of movement of the sheets. Even though these parameters are carefully controlled in making a board with a corrugated core sheet, the sheet tends to curl or warp after it is cooled to room temperature. Furthermore, it has been found that plastic boards having a corrugated core have a considerably lower bending strength along the direction of the corrugations than in the direction across the corrugations.

SUMMARY OF THE INVENTION

According to this invention, a method and apparatus are provided for producing a plastic board of laminated construction which has a uniform bending strength in all directions and which is substantially free of tendency to curl or warp. Further, the method and apparatus enable the production of high quality board at a high rate of production. In general this is accomplished by forming a core sheet of special configuration immediately after the sheet is advanced from the extruder and then bonding the face sheets thereto by fusion immediately after advance of the face sheets from the respective extruders. More particularly, the core sheet is formed as a pocketed core with multiple oppositely extending pockets distributed in a pattern to avoid undesired lines of weakness in the board.

According to the invention the laminated plastic board with a pocketed core is made by extruding a core sheet of thermoplastic resin and feeding it through roll-forming means while it is above its plastic deformation temperature. The roll-forming means forms multiple oppositely extending pockets in the core sheet by multiple forming elements which engage the core sheet at a temperature lower than the sheet. The pockets are desirably disposed on lines extending across the sheet and on lines extending lengthwise of the sheet to obtain high bending strength in both directions. A pair of face sheets of thermoplastic resin are extruded and joined on opposite sides to the formed core sheet by engaging and bonding the face sheet to the extremities of the pockets. The joining is effected by maintaining the sheets at a temperature to effect fusion of the face sheets to the extremities of the pockets.

The process is preferably carried out by rotating the roll-forming means to remove the core sheet therefrom after it has traveled less than one-half revolution of the roll-forming means. During the first portion of the travel the core sheet is drawn against the forming elements, preferably by means of a partial vacuum. During a later portion of the travel of the core sheet on the roll-forming means, the removal of the core sheet is aided by gas pressure applied thereto. The invention provides a roll-forming means including a drum with forming elements on the surface thereof, together with vacuum and pressure applying means. Furthermore, the roll-forming means is provided with heat exchange provisions for accurate temperature control during the process.

DETAILED DESCRIPTION

A more complete understanding of this invention may be obtained from the detailed description that follows, taken with the accompanying drawings in which.

Figure 1:
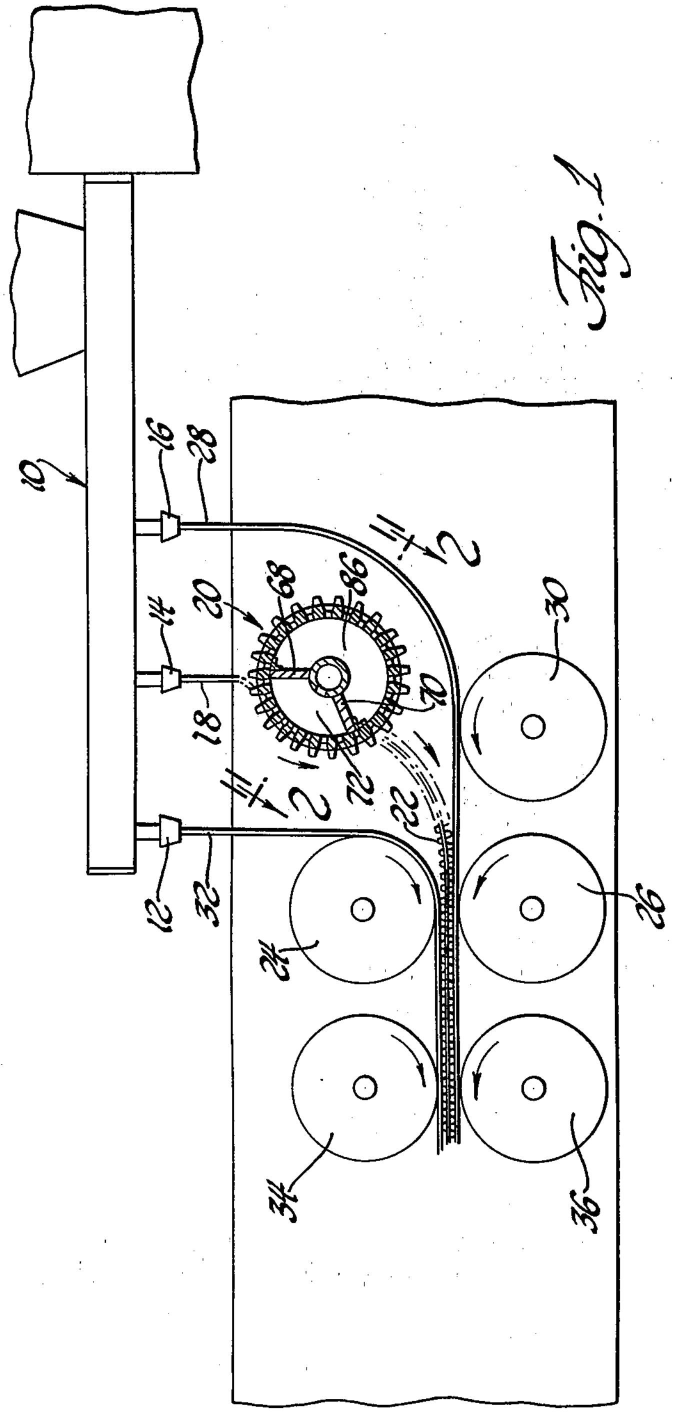
FIG. 1 is an elevation view of a sheet extruder and roll-forming means of the invention.

Referring now to the drawings, there is shown an illustrative embodiment of the invention for making plastic board of laminated construction with a pocketed core. In the illustrated embodiment the sheets of the lamination are made of synthetic thermoplastic resin, such as polypropylene. As the description proceeds, it will be appreciated that the invention is not limited to the use of any particular type of thermoplastic resin. Thermoplastic resins which may be used in the practice of the invention includes polyethylene, polystyrene, polyvinyl chloride and polyvinylidene chloride. Such material may be in the form of sheets, either foamed or nonfoamed. The temperature ranges to be maintained at the various points in the apparatus will, of course, depend upon the materials used. Such temperature ranges for a given resin will be readily ascertainable by those skilled in the art in view of the description that follows. For the sake of explanation typical temperature ranges will be given for the example resin, namely, polypropylene. Further, the description of the illustrative embodiment will be given with reference to making a plastic board for use in fabricating packing cartons; as such, the board will be about ¼ inch thick and of any desired width, with the sheets forming the laminations being of approximately four mils thick.

As shown in FIG. 1, the apparatus for making the plastic board comprises a conventional extruder 10 having three sheet-extruding dies 12, 14 and 16. A flat continuous sheet 18 is extruded from the die 14 at a temperature above the melting point of the resin, which for polypropylene is somewhat above 135°C. The core sheet is fed directly from the extruding die 14 in a vertical path to a roll-forming means 20 which will be described in detail subsequently. The core sheet 18 is formed during its passage over the roll-forming means 20 and a formed core sheet 22 is removed therefrom. The formed core sheet 22, which will be described in detail below, is fed in a horizontal direction toward a pair of press rolls 24 and 26. A face sheet 28 is extruded from the die 16 at a temperature above the melting point of the resin and is advanced vertically and then horizontally to a feed roll 30 and thence toward engagement with the lower surface of the formed core sheet 22 at the throat of the press rolls 24 and 26. Similarly, an upper face sheet 32 is extruded from the die 12 and advanced vertically toward engagement with the upper surface of the formed core sheet 22 at the throat of the press rolls 24 and 26. As will be described further, the face sheets 32 and 28 are joined by fusion with the formed core sheet 22 at the throat of the press rolls 24 and 26. Thus the sheets of the laminated board are joined in a unitary structure and advanced through cooling rolls 34 and 36.

Figure 2:
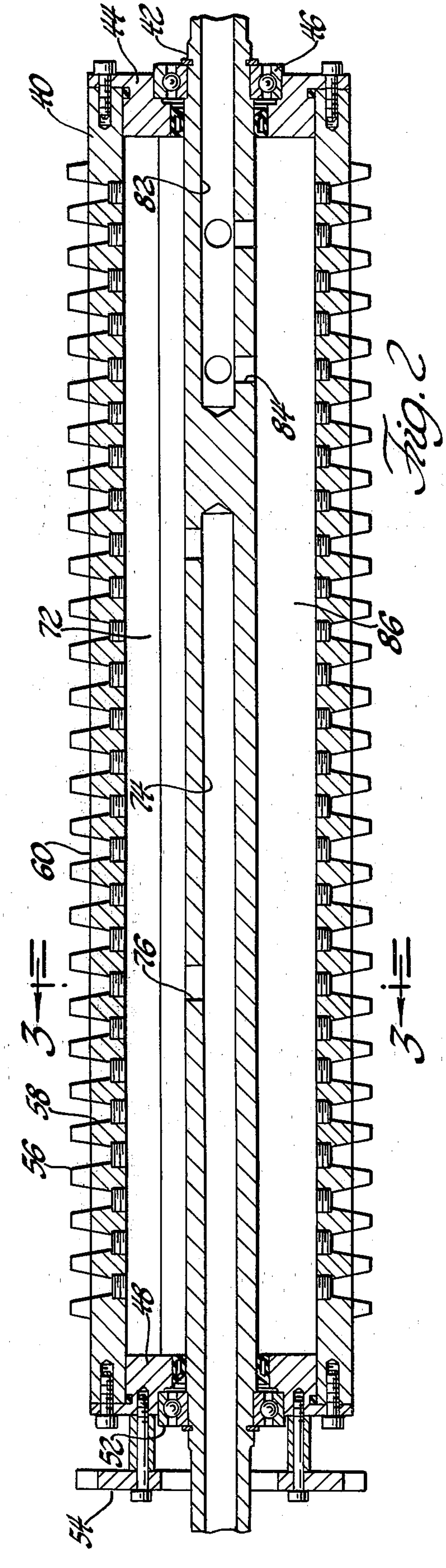
FIG. 2 is a sectional view of the roll-forming means taken on lines 2—2 of FIG. 1.
Figure 3:
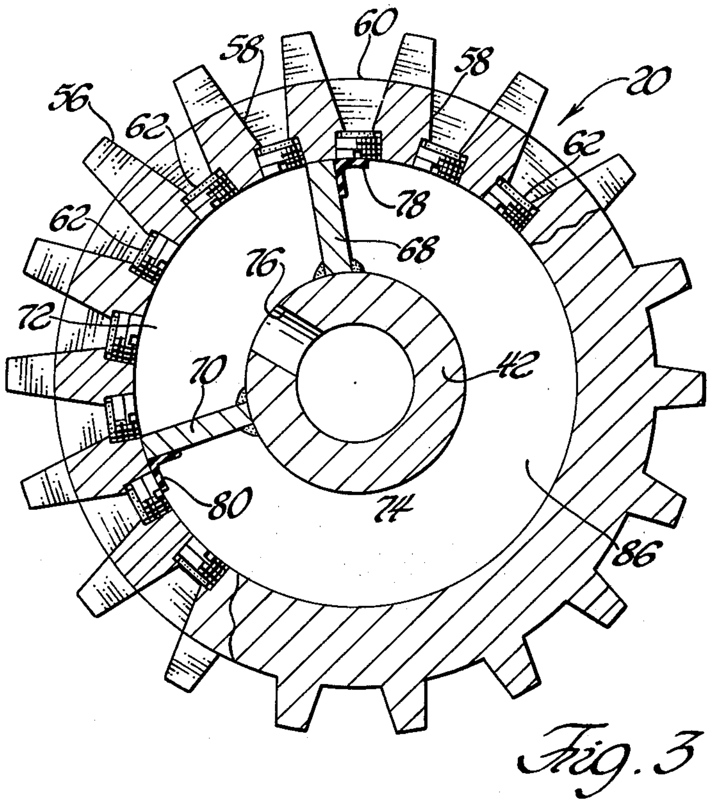
FIG. 3 is a sectional view taken on lines 3—3 of FIG. 2.

Referring now to FIGS. 1, 2 and 3, the forming of the core sheet will be described in further detail. As shown, the roll-forming means 20 comprises an elongated hollow drum 40 which is mounted for rotation about a fixed axle 42. The drum 40 is provided with a hub 44 at one end which is supported on the axle 42 by a bearing 46. The drum 40 is also provided with a hub 48 at the other end which is supported on the axle 42 by a bearing 52. It is noted that the hubs 44 and 48 are connected to the drum 40 with a fluid tight seal and are connected to the axle 42 with a fluid tight seal for reasons which will appear hereinafter. In order to impart rotation to the drum 40 about the axle 42 a sprocket wheel 54 is fixedly mounted on the hub 48 and adapted to be driven at controlled speed by power means which are not shown.

The outer surface of the drum 40 is provided with a multiplicity of forming elements of two different types, namely, convex elements 56 and concave elements 58. It is noted that the convex elements are formed as tapered projections extending radially outwardly with reference to the cylindrical surface 60 of the drum 40. The concave elements 58 are formed in the drum as tapered recesses extending inwardly from a mouth at the cylindrical surface 60 of the drum 40. The convex elements 56 are generally rectangular in cross-section and are wider at the base than at the outer extremity. The concave elements formed in the drum have a wall configuration with a wider cross-sectional area at the mouth than at the inner extremity.

Figure 4:
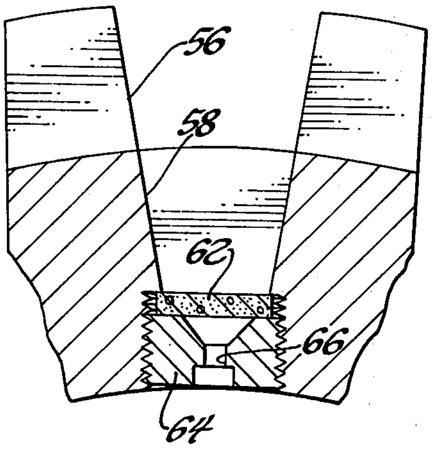
FIG. 4 is an enlarged view of the forming elements on the roll-forming means.

The concave forming elements 58 are in fluid communication by a gas flow passage with the interior of the drum 40. As shown in the enlarged view of FIG. 4 the bottom of the concave element or recess 58 is formed by a porous metal member 62. This porous metal disc 62 is secured in position by a socket head set screw 64 which is provided with an axial passage 66 extending from the porous metal disc to the interior of the drum. It will be appreciated that for certain thermoplastic resins, the porous disc may be replaced by a nonporous disc with one or more small holes in it. Alternatively, the disc and screw may be eliminated and a small hole through the cylinder wall will suffice.

As shown in FIGS. 1 and 3 the interior of the drum is divided by a radially extending partition 68 and a radially extending partition 70, both of which are fixedly mounted on the fixed axle 42. A first chamber, hereinafter referred to as a vacuum chamber 72, is defined by the partitions 68 and 70 and the inner surface of the drum 40. The fixed axle 42 is provided with an axially bore 74 which extends partially therethrough and, as indicated in FIG. 2, is connected to a vacuum pump (not shown). A radial passage 76 connects the bore 74 with the vacuum chamber 72. Accordingly, with the vacuum pump in operation the chamber 72 is maintained at a partial vacuum which is communicated to the concave forming elements or recesses 58 which are in communication with the chamber 72 through the porous members 62. It is noted that the partitions 68 and 70 are provided with rotary field members 78 and 80 to avoid loss of vacuum in chamber 72.

The fixed axle 42 is provided with a second axial bore 82 extending from the other end, partially therethrough. As shown in FIG. 2 the right hand end of the bore 82 is connected with a gas pump, suitably an air pump. The bore 82 is connected through radial passages 84 to a chamber 86 formed by the partitions 68 and 70 and the drum 40. The chamber 86, hereinafter referred to as pressure chamber 86, is maintained at super-atmospheric pressure when the air pump is operating. Accordingly, air-flow is provided through the porous members 62 in those recesses or forming elements 58 which are in communication with the pressure chamber 86.

Figure 7:
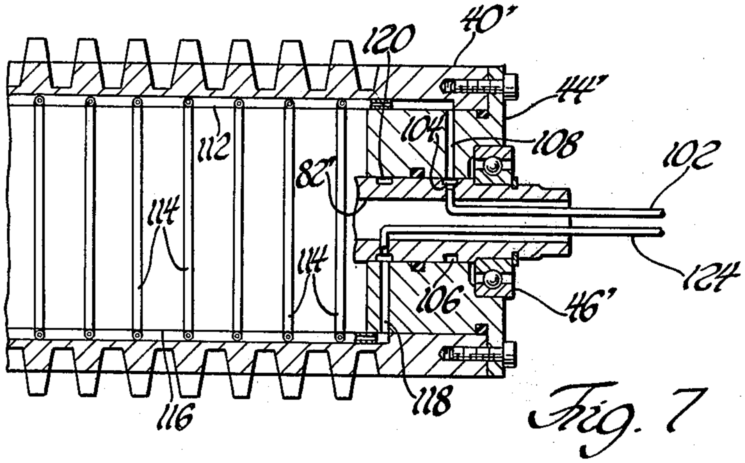
FIG. 7 shows a modification of the roll-forming means.

As shown in FIG. 7, the roll-forming means is desirably provided with heat exchange means for accurate temperature control. The structure of the roll-forming means is substantially the same as that shown in FIG. 2 with the addition of fluid passages for circulating a heat exchange fluid in heat exchange relation with the roll-forming means. The fluid heat exchange medium is suitably oil which is maintained at a controlled temperature and pumped through the passages by means not shown. The modified roll-forming means comprises a drum 40' supported upon a fixed axle 42'. A hub 44' supports the drum on the axle by a bearing 46' in the same manner as described with reference to FIG. 2. An inlet tube 102 extends into a bore 82' of the axle and communicates through a radial passage 104 with an annular groove 106 in the outer surface of the axle. A radial passage 108 through the hub 44' connects the groove 106 with an annular groove 110 in the inner surface of the drum 40'. An axial passage 112 extends the length of the drum 40' and serves as an inlet header for a plurality of annular passages 114, which are formed in the wall of the drum 40'. Each of the annular passages 114 communicates with the inlet header passage 112. An outlet header passage 116 which extends axially for the length of the drum is disposed on the opposite side from the header 112. The outlet header passage 116 also communicates with the annular passages 114 and is connected with a radial passage 118 extending through the hub 44'. A passage 118 communicates with an annular groove 120 formed in the outer surface of the axle. The groove 120 is connected by a radial passage 122 to an outlet tube 124. The inlet tube 102 and the outlet tube 124 are connected respectively to supply and return fittings of a temperature control and pumping means not shown. By means of this heat exchange system the drum 40' may be maintained at the desired temperature for operation.

In operation of the apparatus just described for forming a laminated plastic board, the extruder 10 is brought into operation with the die 14 extruding the core sheet 18, the die 12 extruding the upper face sheet 32 and the die 16 extruding the lower face sheet 28. All of the sheets at the extruding dies are at a temperature above the melting point of the resin which, as stated, is higher than 135°C for polypropylene resin. The core sheet 18 is advanced to engagement with the roll-forming means 20 which is rotatably driven in the direction indicated by the arrow in FIG. 1. The drum 40 of the roll-forming means is maintained at a temperature in the range of 80° to 120°C for polypropylene resin. With the roll-forming means in operation the vacuum pump is connected with the vacuum chamber 72 and the air pump is connected with the pressure chamber 86. Accordingly, during the first portion of travel of the core sheet 18 on the roll-forming means 20, the sheet is laid on the extremities of the convex forming means or projections 56. Because of its highly plastic condition at the elevated temperature the core sheet 18 tends to drape over the forming elements 56 and sag toward the concave forming elements 58. The partial vacuum applied to the concave forming elements or recesses 58 is effective to draw the plastic sheet into close conformity with the forming elements. Stated otherwise, the atmospheric air pressure outside the core sheet 18 presses the core sheet inwardly against the forming elements. This conformity of the core sheet to the configuration of the forming elements continues throughout the travel over the vacuum chamber, i.e. from the partition 68 to the partition 70. The temperature control of the roll-forming means 20 provided by the heat exchange arrangement, as shown in FIG. 7, maintains the forming elements at the desired temperature within the range of 80° to 120°C for polypropylene. Since the forming elements are maintained at a temperature lower than that of the core sheet 18 the core sheet does not stick to the forming elements. Accordingly, when the direction of travel of the core sheet 22 is changed away from the surface of the roll-forming means 20 the formed core sheet 22 tends to separate therefrom. Separation is enhanced by the tapered configuration of the forming elements. To insure separation of the formed core sheet from the forming elements at the desired point in the travel over the roll-forming means the air pressure supplied from the pressure chamber 86 exerts an outward force through the porous members 62 to positively lift the formed core sheet from the forming elements.

Figure 6:
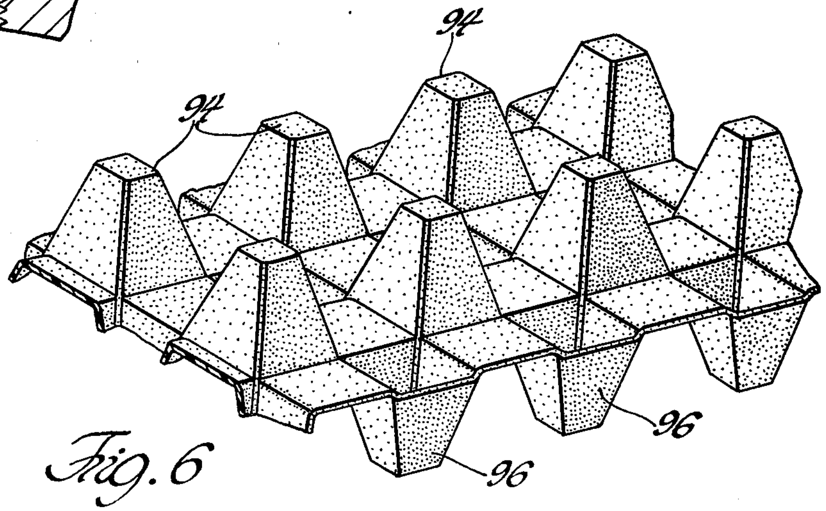
FIG. 6 shows a core sheet made in accordance with the invention.

The configuration of the core sheet 22 as it leaves the roll-forming means 20 is illustrated in FIG. 6. Note that the core sheet is provided with a multiplicity of oppositely disposed pockets. The pockets 94 on the upper surface of the core sheet are upside down or inverted and have the same configuration as the convex forming elements 56. The pockets 96 on the lower side of the core sheet are open at the top, i.e. right side up or noninverted and conform to the configuration of the concave forming elements or recesses 58.

Referring again to FIG. 1, it is noted that the formed core sheet 22 and the upper face sheet 32 and the lower face sheet 28 are brought into engagement at the throat of the press rolls 24 and 26. It is at this point that the face sheets are bonded by fusion or welding to the extremities of the pockets of the core sheet. For this purpose the temperature of the face sheet is maintained in the range of 75° to 115°C at the throat of the press rolls 24 and 26 while the temperature of the formed core sheet is maintained in the range of 60° to 100°C at this point. From the press rolls 24 and 26 the unitary laminated board is advanced through the cooling rolls 34 and 36 and thence to the output of the machine.

Figure 5:
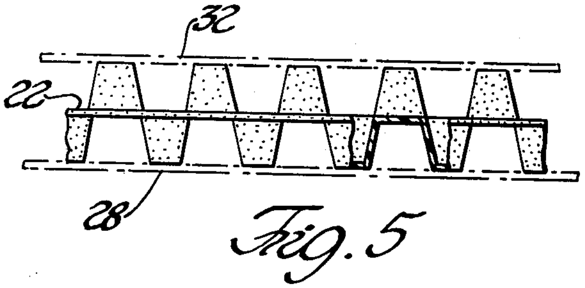
FIG. 5 shows a plastic board made in accordance with the invention.

The finished plastic board as illustrated in FIG. 5, comprises the formed core sheet, together with the upper face sheet 32 and the lower face sheet 28, bonded into a unitary laminated article. It is to be noted, with reference to FIGS. 5 and 6 that the pockets form lines which run both lengthwise and crosswise of the board, i.e. the rows of inverted pockets 94 extend across the rows of noninverted pockets 96. Accordingly, the board has bending strength which is the same in both directions. Because of the bidirectional lines of bonding between the core sheet and the face sheets the finished board has virtually no tendency to warp or curl, even though there may be residual stresses which result from uneven cooling rates and the like.

Figure 8:
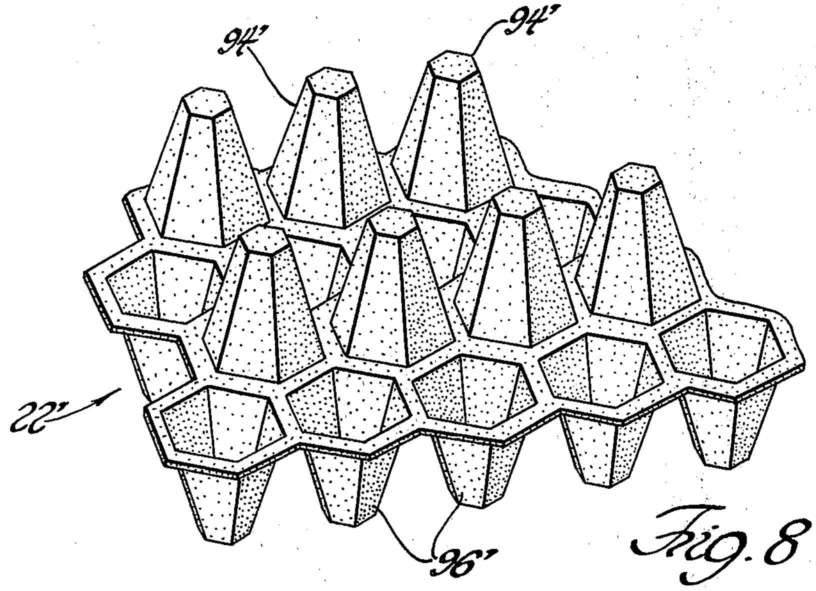
FIGS. 8 and 9 show a modified core sheet construction.
Figure 9:
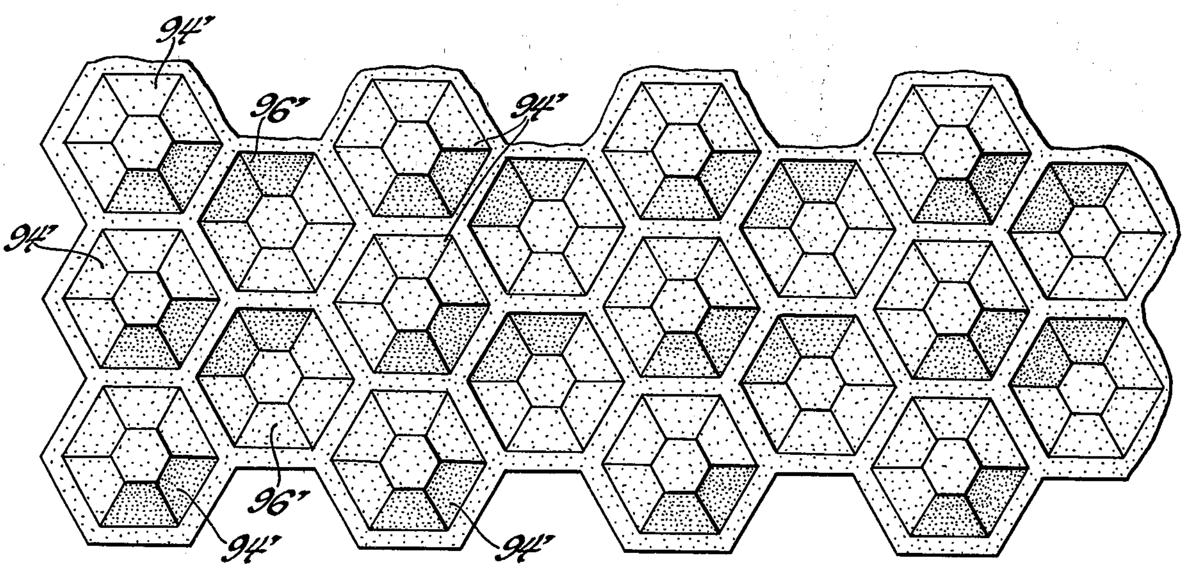

A modified form of the core sheet is shown in FIGS. 8 and 9. It will be noted as the description proceeds that this core sheet includes rows of inverted pockets extending across rows of noninverted pockets, as in the case of the core sheet of FIG. 6. Further, however, this core sheet has the pockets disposed in a pattern which provides omnidirectional lines of bonding between the core sheet and the face sheets and accordingly the bending strength of the finished board is uniform in all directions.

Referring now to FIGS. 8 and 9, the core sheet 22' in its deformed condition comprises a multiplicity of inverted pockets 94' and a multiplicity of noninverted pockets 96'. Each of the pockets has the configuration of a truncated hexogonal pyramid so that the outer extremity or flat top has a suitable area for bonding to the face sheets. It is noted that the hexagonal pockets are arranged in a pattern such that any given pocket is surrounded by six other pockets, each having a side parallel to one of the sides of the given pocket. Further, it is noted that rows of inverted and noninverted pockets extending parallel to each other are disposed alternately in the pattern of the pocketed core sheet. It will be apparent that the pocketed core of FIGS. 8 and 9 may be produced in the same manner as the pocketed core of FIG. 6 by roll-forming means similar to the that shown in FIGS. 2 and 3.

Although the description of this invention has been given with respect to a particular embodiment, it is not to be construed in a limiting sense. Many variations and modifications will now ocurr to those skilled in the art. For a definition of the invention reference is made to the appended claims.

The embodiments of the present invention in which an exclusive property or priviledge is claimed are defined as follows:

1. The method of making a laminated board with a pocketed core comprising the steps of extruding a core sheet of thermoplastic resin at a temperature higher than the melting point thereof, feeding said core sheet through roll-forming means while it is above its plastic deformation temperature deforming portions of said core sheet by vacuum-drawing said core sheet against multiple convex forming elements protruding outwardly from cylindrical reference surface of the roll-forming means and disposed in parallel rows extending in one direction and against multiple concave forming elements receding inwardly of the cylindrical reference surface and disposed in parallel rows in a transverse direction and against said cylindrical reference surface, said forming elements being spaced apart by portions of said cylindrical reference surface, to form multiple pockets with rows of inverted pockets extending across rows of noninverted pockets with substantially flat and relatively non-deformed portions of said sheet between adjacent pockets, maintaining said forming elements at a temperature lower than said core sheet, rotating said roll-forming means to remove said core sheet therefrom after carrying it less than one revolution, extruding a pair of face sheets of thermoplastic resin at a temperature higher than the melting point thereof, joining said face sheets to the deformed core sheet by continuously advancing the extruded face sheets on opposite sides of the deformed core sheet at the same rate as the deformed core sheet, and engaging and bonding the inner surface of one face sheet with the outer extremities of the inverted pockets and engaging and bonding the inner surface of the other face sheet with the extremities of the noninverted pockets, said joining being effected after said core sheet is removed from the roll-forming means and by maintaining said face sheets at sufficiently high temperature to effect fusion of the extremities of the said pockets with said face sheets.

2. The invention as defined in claim 1, including the step of applying gas pressure between the core sheet and roll-forming means after the step of drawing the core sheet against the forming elements, to thereby detach the formed core sheet from said elements.

3. The invention as defined in claim 2, including the step of circulating a heat exchange fluid through said roll-forming means during rotation thereof to maintain said forming elements at a temperature a predetermined value below the temperature of said core sheet.

4. The invention as defined in claim 2, wherein said forming step includes shaping all of said pockets with a smaller cross-section at the extremity thereof than at the base thereof to thereby facilitate the removal of the core sheet from the forming elements.

5. Apparatus for making a laminated board with a pocketed core comprising first extruder means for extruding a thermoplastic resin in the form of a sheet at a temperature higher than the melting point of said resin, roll-forming means adjacent said first extruder means and including a rotatable roll having a cylindrical surface portion and having multiple forming elements disposed thereon, said rotatable roll being adapted to receive said sheet and carry it in a downstream direction through less than one revolution of the roll, means for maintaining said forming elements at a temperature lower than said sheet, said multiple forming elements including a first group of elements which are convex relative to the cylindrical surface portion of said roll and including a second group of elements which are concave relative to said cylindrical surface portion, each of said forming elements being separated from adjacent forming elements by a part of said cylindrical surface portion, means for applying a partial vacuum to the region between the sheet and the surface of the roll for urging said sheet toward said roll into engagement with said convex and concave forming elements and with said cylindrical surface portion while the sheet is above its plastic deformation temperature, said forming elements being disposed in an array in which concave and convex elements occur alternately with lines of convex elements extending across lines of concave elements, whereby said sheet is formed with multiple oppositely opening pockets with substantially flat portions of said sheet between adjacent pockets, means adjacent the roll-forming means for changing the direction of advance of said sheet away from the roll-forming means to remove the sheet from said forming elements, second and third extruder means disposed relative to said first extruder means for extruding a pair of face sheets of thermoplastic resin on opposite sides of said core sheet, and means on opposite sides of said face sheets and located at a position downstream of the roll-forming means for guiding and maintaining said face sheets at a fusion bonding temperature and in engagement with the extremities of said pockets in said core sheet after the core sheet leaves the roll-forming means for effecting a joinder of each face sheet to said core sheet.

6. The invention as defined in claim 5 wherein said means for applying a partial vacuum includes a porous member forming at least part of the wall of said concave forming elements, and means connected with the porous members for partially evacuating air from said concave forming elements.

7. The invention as defined in claim 5 wherein said rotatable roll comprises a hollow drum, a pair of stationary partitions within said drum and being coextensive in the axial direction with the forming elements in the wall of said drum, said partitions and a first portion of the wall of said drum defining a vacuum chamber, said partitions and a second portion of the wall of said drum defining a pressure chamber, gas passage means forming at least part of the wall of said concave forming elements and communicating with the interior of said drum, said vacuum chamber being disposed ahead of said pressure chamber relative to the direction of rotation of said drum.

8. The invention as defined in claim 7 wherein said gas passage means includes a porous metal member.

9. The invention as defined in claim 5 wherein said convex forming elements are formed as a tapered boss on the surface of said roll having an extremity narrower than the base and wherein said concave forming elements are formed as a tapered recess in the surface of said roll having an extremity narrower than the mouth.

10. The invention as defined in claim 5 wherein said means for maintaining said elements at a temperature lower than said sheet comprises fluid passages formed in said roll, and means for supplying a heat exchange fluid to said fluid passages.

11. The invention as defined in claim 10 wherein said fluid passages comprise a slot of helical configuration defined by the inner surface of said roll, a tube disposed within said slot, means for supplying heat exchange fluid to one end of said tube and means for withdrawing heat exchange fluid from the other end of said tube.

12. The invention as defined in claim 11, wherein said means for supplying the heat exchange fluid comprises a source of heating fluid and a source of cooling fluid and means for alternately connecting said sources.

* * * * *